United States Patent
Saito

(10) Patent No.: US 9,860,454 B2
(45) Date of Patent: *Jan. 2, 2018

(54) REPRODUCING APPARATUS AND REPRODUCING METHOD

(71) Applicant: CANON KABUSHIKI KAISHA, Tokyo (JP)

(72) Inventor: Tetsuji Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,339

(22) Filed: Dec. 12, 2016

(65) Prior Publication Data

US 2017/0094147 A1    Mar. 30, 2017

Related U.S. Application Data

(63) Continuation of application No. 14/966,159, filed on Dec. 11, 2015, now Pat. No. 9,661,238, which is a
(Continued)

(30) Foreign Application Priority Data

Feb. 26, 2009 (JP) ................................. 2009-044324

(51) Int. Cl.
H04N 5/235 (2006.01)
H04N 5/265 (2006.01)
(Continued)

(52) U.S. Cl.
CPC ....... *H04N 5/2355* (2013.01); *H04N 5/23293* (2013.01); *H04N 5/265* (2013.01);
(Continued)

(58) Field of Classification Search
CPC ........ H04N 5/2355; H04N 5/57; H04N 5/225; H04N 5/265; H04N 9/80; H04N 21/44008; H04N 21/4318
See application file for complete search history.

(56) References Cited

U.S. PATENT DOCUMENTS 5,801,773 A     9/1998 Ikeda
6,204,881 B1    3/2001 Ikeda et al.
(Continued)

FOREIGN PATENT DOCUMENTS

JP        7-131718 A        5/1995
JP     2003-348438 A       12/2003
(Continued)

*Primary Examiner* — Huy T Nguyen

(74) *Attorney, Agent, or Firm* — Fitzpatrick, Cella, Harper & Scinto

(57) ABSTRACT

To more flexibly reproduce moving image data obtained by capturing a plurality of frames within the period of a single frame of display output while changing the exposure condition. For example, moving image data, which has been obtained by capturing a plurality of frames within the period of a single frame of display output while changing the exposure condition, is stored in a recording portion. When the moving image data is reproduced from the recording portion, a single frame is selected and output by a reproduced frame selecting portion for each period of a single frame of display output. If a user operation instructing to make the displayed image darker, in response to this user operation, a frame having an exposure condition of underexposure is selected and output from the moving image data to be reproduced from the recording portion for each period of a single frame of display output.

52 Claims, 9 Drawing Sheets

Related U.S. Application Data continuation of application No. 14/339,543, filed on Jul. 24, 2014, now Pat. No. 9,247,154, which is a continuation of application No. 14/087,156, filed on Nov. 22, 2013, now Pat. No. 8,831,404, which is a continuation of application No. 13/746,414, filed on Jan. 22, 2013, now Pat. No. 8,620,138, which is a continuation of application No. 12/694,590, filed on Jan. 27, 2010, now Pat. No. 8,380,043.

(51) Int. Cl.
  *H04N 5/57* (2006.01)
  *H04N 5/76* (2006.01)
  *H04N 9/80* (2006.01)
  *H04N 5/232* (2006.01)

(52) U.S. Cl.
  CPC ............... *H04N 5/57* (2013.01); *H04N 5/76* (2013.01); *H04N 9/80* (2013.01)

(56) References Cited

U.S. PATENT DOCUMENTS

| | | | |
|---|---|---|---|
| 8,380,043 | B2 | 2/2013 | Saito |
| 8,620,138 | B2 | 12/2013 | Saito |
| 8,831,404 | B2 | 9/2014 | Saito |
| 9,247,154 | B2 | 1/2016 | Saito |
| 2003/0108222 | A1* | 6/2003 | Sato ............... H04N 7/183 382/104 |
| 2006/0007341 | A1 | 1/2006 | Nakamura et al. |
| 2006/0036948 | A1 | 2/2006 | Matsuzaka |
| 2007/0297753 | A1 | 12/2007 | Usui et al. |
| 2008/0024643 | A1 | 1/2008 | Kato |
| 2008/0199103 | A1 | 8/2008 | Kawahara |

FOREIGN PATENT DOCUMENTS

| | | |
|---|---|---|
| JP | 2007-228099 A | 9/2007 |
| JP | 2007-328555 A | 12/2007 |
| JP | 2008-124671 A | 5/2008 |

\* cited by examiner

REPRODUCING APPARATUS AND REPRODUCING METHOD

This application is a continuation of application Ser. No. 14/966,159 filed Dec. 11, 2015, which is a continuation of application Ser. No. 14/339,543 filed Jul. 24, 2014, U.S. Pat. No. 9,247,154 B2, which is a continuation of application Ser. No. 14/087,156 filed Nov. 22, 2013, U.S. Pat. No. 8,831,404 B2, which is a continuation of application Ser. No. 13/746,414 filed Jan. 22, 2013, U.S. Pat. No. 8,620,138 B2, which is a continuation of application Ser. No. 12/694,590 filed Jan. 27, 2010, U.S. Pat. No. 8,380,043 B2.

BACKGROUND OF THE INVENTION

Field of the Invention

The present invention relates to a reproducing apparatus and a reproducing method for reproducing moving image data obtained by capturing a plurality of images under different exposure conditions, within the period of a single frame of display output.

Description of the Related Art

In recent years, methods of capturing a plurality of images having different exposure conditions, and combining a plurality of image data items including the plurality of images to obtain a single image having an expanded dynamic range have been proposed (see Japanese Patent Laid-Open Nos. 7-131718 and 2007-228099, for example). Moreover, in recent years, with an increase in the speed at which image data is read out by an image sensing device such as a CMOS sensor, and an increase in the resolution of such an image sensing device, it has become possible for an image sensing apparatus to capture images at a high resolution and a high frame rate.

Conventionally, however, the following problem arises when a high-resolution, high-frame-rate moving image obtained by capturing a plurality of frames while changing the exposure condition is reproduced within the period of a single frame of display output. That is to say, conventionally, even though the dynamic range can be expanded by combining a plurality of frames within the period of a single frame, it is not possible to select and reproduce a bright frame or a dark frame from a plurality of frames within the period of a single frame as desired by a user.

SUMMARY OF THE INVENTION

Therefore, it is a feature of the present invention to provide a reproducing apparatus that is capable of more flexibly reproducing moving image data obtained by capturing a plurality of frames within the period of a single frame of display output while changing the exposure condition.

According to a first aspect of the present invention, there is provided a reproducing apparatus that reproduces moving image data obtained by capturing images so that a plurality of frames having different exposure conditions is included in a period of a single frame of display output, the apparatus comprising: a recording unit that stores the moving image data; a selecting unit that selects, from the moving image data stored in the recording unit, a single frame having an exposure condition that is designated in accordance with a user operation out of the plurality of frames included in the period of a single frame of display output; and a reproducing unit that reproduces the frame selected by the selecting unit.

According to a second aspect of the present invention, there is provided a reproducing apparatus that reproduces moving image data obtained by capturing images so that a plurality of frames having different exposure conditions is included in a period of a single frame of output display, the apparatus comprising: a recording unit that stores the moving image data; a selecting unit that selects, from the moving image data stored in the recoding unit, at least one frame out of the plurality of frames included in the period of a single frame of display output; a reproducing unit that reproduces the frame selected by the selecting unit; and an accepting unit that accepts designation of an attention area with respect to the moving image data reproduced by the reproducing unit, wherein the selecting unit selects a single frame out of the plurality of frames included in the period of a single frame of display output on the basis of a characteristic of the designated attention area.

According to a third aspect of the present invention, there is provided a reproducing apparatus that reproduces moving image data obtained by capturing images so that a plurality of frames having different exposure conditions is included in a period of a single frame of output display, the apparatus comprising: a recording unit that stores the moving image data; a selecting unit that selects, from the moving image data stored in the recoding unit, at least one frame out of the plurality of frames included in the period of a single frame of display output; a reproducing unit that reproduces the frame selected by the selecting unit; and an accepting unit that accepts designation of an attention area with respect to the moving image data reproduced by the reproducing unit, wherein the selecting unit selects a single frame out of the plurality of frames included in the period of a single frame of display output on the basis of a characteristic of the designated attention area.

According to a fourth aspect of the present invention, there is provided a method for reproducing moving image data obtained by capturing images so that a plurality of frames having different exposure conditions is included in a period of a single frame of display output, the method comprising: a selecting step of selecting, from the moving image data stored in a recording unit, at least one frame out of the plurality of frames included in the period of a single frame of display output; a reproducing step of reproducing the frame selected in the selecting step; and an accepting step of accepting designation of an attention area with respect to the moving image data reproduced in the reproducing step, wherein in the selecting step, a single frame is selected out of the plurality of frames included in the period of a single frame of display output on the basis of a characteristic of the designated attention area.

According to the present invention, moving image data obtained by capturing a plurality of frames within the period of a single frame of display output while changing the exposure condition can be reproduced in a more flexible manner.

Further features of the present invention will become apparent from the following description of exemplary embodiments with reference to the attached drawings.

DESCRIPTION OF THE EMBODIMENTS

First Embodiment

Figure 1:
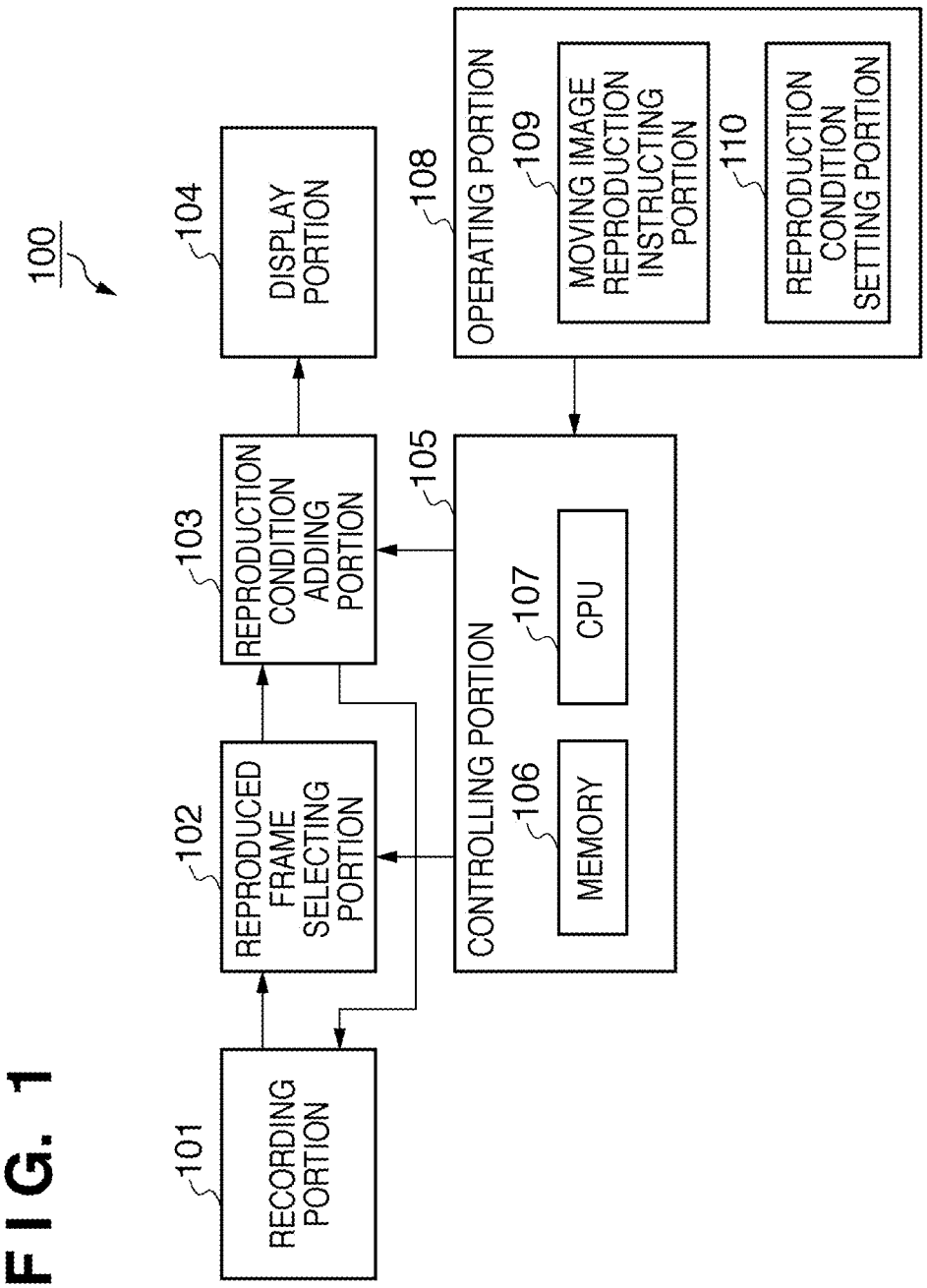
FIG. 1 is a block diagram showing an exemplary configuration of a reproducing apparatus that is applicable to a first embodiment of the present invention.

Hereinafter, a first embodiment of the present invention will be described with reference to the drawings. FIG. 1 shows an exemplary configuration of a reproducing apparatus 100 that is applicable to the first embodiment of the present invention. The reproducing apparatus 100 includes a recording portion 101, a reproduced frame selecting portion 102, a reproduction condition adding portion 103, a display portion 104, a controlling portion 105, and an operating portion 108. The controlling portion 105 is provided with a memory 106 and a CPU (central processing unit) 107. The CPU 107 controls the operation of the various portions of this reproducing apparatus 100 in accordance with a program stored in the memory 106.

The recording portion 101 serving as a recording unit uses, for example, a hard disk drive, an optical disk, a nonvolatile semiconductor memory, or the like as a recording medium, and moving image data to be reproduced by this reproducing apparatus 100 is stored in the recording portion 101. Here, it is assumed that moving image data obtained by capturing a plurality of frames within the period of a single frame of display output while changing an exposure condition, such as exposure time, is stored in the recording portion 101. That is to say, this moving image data is moving image data having a higher frame rate than the frame rate at which video is displayed on the display portion 104, and is composed of a plurality of sets of frames having different exposure conditions.

The display portion 104 outputs a single frame of the moving image data to a display apparatus or the like per each period of a single frame of display output. Hereinafter, the period of a single frame of display output will be referred to as the period of a single reproduced frame and distinguished from the frame period of captured images. Note that in the first embodiment, the reproducing rate in the display portion 104 is assumed to be 60 fps (frames per second).

During reproduction of the moving image data stored in the recording portion 101, the reproduced frame selecting portion 102 serving as a selecting unit and a reproducing unit selects a frame to be reproduced out of a plurality of frames within the period of a single reproduced frame and reproduces the selected frame under the control of the controlling portion 105. The reproduction condition adding portion 103 serving as a reproduction condition saving unit saves the reproduction state of the moving image data stored in the recording portion 101. For example, the reproduction condition adding portion 103 saves information about the frame selected by the reproduced frame selecting portion 102.

The operating portion 108 is a portion for accepting a user operation and includes a moving image reproduction instructing portion 109 and a reproduction condition setting portion 110. The operating portion 108 outputs a control signal based on a user operation performed on the moving image reproduction instructing portion 109 and the reproduction condition setting portion 110 and supplies the control signal to the controlling portion 105. The moving image reproduction instructing portion 109 provides an instruction to reproduce the moving image data stored in the recording portion 101. Moreover, the reproduction condition setting portion 110 sets the reproduction condition for the moving image data stored in the recording portion 101. For example, the reproduction condition setting portion 110 can set a condition so that a frame having a predetermined exposure condition is reproduced out of a plurality of frames within the period of a single frame.

Figure 2:
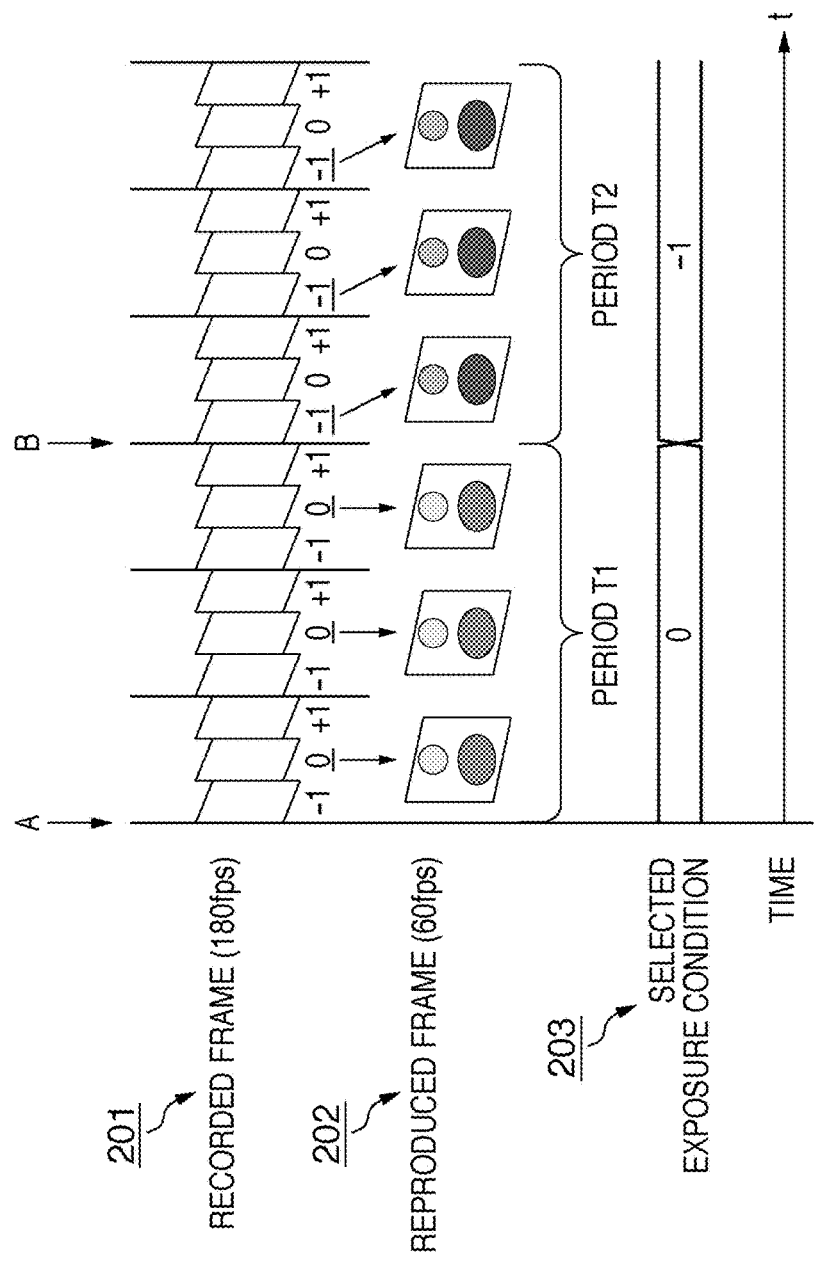
FIG. 2 is a diagram showing an exemplary relationship between moving image data saved in a recording portion and a frame to be output to a display portion according to the first embodiment of the present invention, with the horizontal axis representing time.

FIG. 2 shows an exemplary relationship between the moving image data saved in the recording portion 101 and a frame to be output to the display portion 104, with the horizontal axis representing time. An example of the moving image data stored in the recording portion 101 is indicated by reference numeral 201 in FIG. 2, and an example of the moving image data to be output to the display portion 104 is indicated by reference numeral 202 in FIG. 2.

In this example, it is assumed that the moving image data stored in the recording portion 101 is recorded at a frame rate of 180 fps. On the other hand, the moving image data output to the display portion 104 is reproduced at a frame rate of 60 fps. That is to say, the moving image data stored in the recording portion 101 has been obtained by capturing three frames per period of a single reproduced frame while changing the exposure condition. Here, it is assumed that, as indicated by reference numeral 201 in FIG. 2 by way of example, the moving image data stored in the recording portion 101 has been obtained by repeatedly capturing frames at exposure levels from (−1) to (+1) in the order of underexposure (−1), proper exposure (0), and overexposure (+1) on a frame-by-frame basis.

Note that it is assumed that information indicating the exposure condition such as underexposure, proper exposure, and overexposure is stored in the recording portion 101 in association with each frame of the moving image data. For example, it is conceivable to add the information indicating the exposure condition to data of each frame as attribute information of the frame. This is not a limitation, and the information indicating the exposure condition may also be stored in the recording portion 101 as management data separate from the moving image data, in association with information that can specify the frame. The information indicating the exposure condition is output in conjunction with a corresponding frame when, for example, the moving image data is reproduced from the recording portion 101. The reproduced frame selecting portion 102 can select a frame to be reproduced out of a plurality of frames within the period of a single reproduced frame on the basis of the information indicating the exposure condition output in conjunction with each frame.

Reproducing Operation According to the First Embodiment

Next, an operation for reproducing moving image data according to the first embodiment will be described. For example, at time A in FIG. 2, reproduction of the moving image data stored in the recording portion 101 is instructed by the moving image reproduction instructing portion 109 of the operating portion 108 in accordance with a user operation.

Here, as described above, the moving image data stored in the recording portion 101 is recorded at a frame rate of 180 fps and reproduced at a frame rate of 60 fps when output to the display portion 104. Accordingly, the reproduced frame selecting portion 102 selects one frame having an optimum exposure condition out of every three frames of the moving image data stored in the recording portion 101.

Here, it is assumed that in the reproduced frame selecting portion 102, frames that have been exposed at proper exposure (0) and recorded are selected out of the frames reproduced from the recording portion 101. For example, it is assumed that unless a predetermined user operation is performed on the reproduction condition setting portion 110, properly exposed (0) frames are selected. In the example shown in FIG. 2, properly exposed (0) frames are selected during period T1 (see reference numeral 203 in FIG. 2). Note that the reproduced frame selecting portion 102 may selectively read out frames at a designated exposure level from the moving image data stored in the recording portion 101.

Next, at time B in FIG. 2, it is assumed that an instruction to decrease the brightness of video of the moving image data that is being reproduced is input by a user operation of the reproduction condition setting portion 110. In this case, the brightness of the reproduced video can be decreased by selecting frames at a lower exposure level than the frames that are currently being reproduced. In this example, the frames to be selected will be changed from properly exposed (0) frames to underexposed (−1) frames.

The controlling portion 105 instructs the reproduced frame selecting portion 102 to select underexposed (−1) frames, in accordance with the control signal that is supplied from the operating portion 108 in accordance with the user operation of the reproduction condition setting portion 110. In accordance with this instruction from the controlling portion 105, the reproduced frame selecting portion 102 selects one underexposed (−1) frame per period of a single reproduced frame from the moving image data to be reproduced from the recording portion 101, using the information indicating the exposure condition. In the example shown in FIG. 2, an underexposed (−1) frame is selected and reproduced in each period of a reproduced frame during period T2 (see reference numeral 203 in FIG. 2) after time B. In this case, for example, an image of a part becomes visible where the highlights have been clipped in a properly exposed frame.

Figure 3:
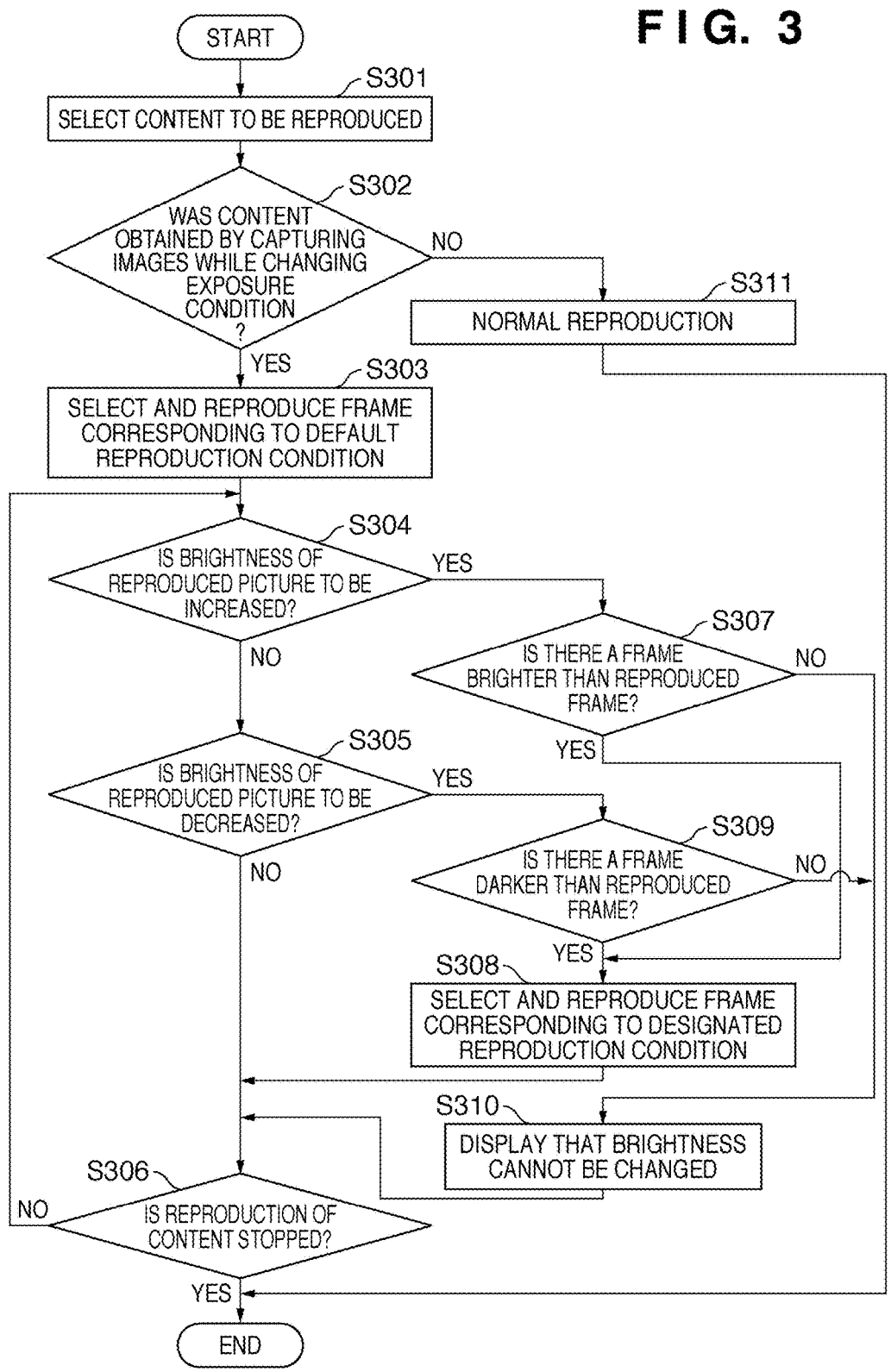
FIG. 3 is a flowchart showing an exemplary reproduction process according to the first embodiment of the present invention.

The above-described process will be described using a flowchart. FIG. 3 is a flowchart of a process for controlling the moving image data reproducing operation according to the first embodiment. First, in step S301, content to be reproduced is selected by a user. The selection of the content to be reproduced is instructed by a control signal that is input by the user operating the moving image reproduction instructing portion 109 of the operating portion 108.

After the content to be reproduced is selected, in step S302, the controlling portion 105 determines whether or not the content is video content obtained by capturing images while changing the exposure condition. Note that although not shown in this flowchart, it is assumed that this controlling process is performed when the frame rate of the content to be reproduced is higher than the display frame rate. If the content to be reproduced is content obtained by capturing images while changing the exposure condition (Yes in S302), the process is advanced to step S303. In step S303, the reproduced frame selecting portion 102 selects a frame corresponding to a reproduction condition defined by default out of the frames of the content. For example, one frame that is given information indicating an exposure condition of proper exposure (0) is selected per period of a single reproduced frame. Then, the selected frames are used to perform reproduction. On the other hand, if the content is not content obtained by capturing images while changing the exposure condition (No in S302), in step S311, the controlling portion 105 performs an ordinary reproduction process that is commonly known. In this reproduction process, one frame per period of a single reproduced frame is selected at regular intervals and the selected frames are displayed at the display frame rate of the display portion 104. This reproduction process is not directly related to the present invention, and a detailed description thereof is therefore omitted.

After the content is reproduced in step S303, in step S304, the controlling portion 105 determines whether or not an instruction input to increase the brightness of video that is being reproduced is generated by a user operation of the reproduction condition setting portion 110. If an instruction input to increase the brightness is generated (Yes in S304), in step S307, the controlling portion 105 determines whether or not there is a frame that is given information indicating a brighter exposure condition than a frame that is currently being reproduced. If there is a brighter frame (Yes in S307), the process is advanced to step S308, and the controlling portion 105 instructs the reproduced frame selecting portion 102 to select a frame having a brighter exposure condition than the exposure condition of the currently reproduced frame. For example, in the case where the exposure condition of the currently reproduced frame is proper exposure (0), an overexposed (+1) frame is selected and reproduced by performing the same processing as the processing of step S303.

In step S307, if the controlling portion 105 determines that there is no brighter frame than the frame that is being reproduced (No in step S307), the process is advanced to step S310, and the controlling portion 105 displays a message stating that the brightness of the video content cannot be changed on the display portion 104.

In step S304, if an instruction input to increase the brightness is not generated (No in S304), the process is advanced to step S305. In step S305, the controlling portion 105 determines whether or not an instruction input to decrease the brightness of the video that is being reproduced is generated by a user operation of the reproduction condition setting portion 110. In step S309, to which the process is advanced if the determination result of step S305 is Yes, the controlling portion 105 determines whether or not there is a darker frame than the frame that is being reproduced. If there is no darker frame than the frame that is being reproduced (No in S309), the process is advanced to the above-described step S310. If there is a darker frame than the frame that is being reproduced (Yes in S309), the process is advanced to the above-described step S308.

In step S306, the controlling portion 105 determines whether or not the reproduction of the content that is being reproduced is stopped. The reproduction is stopped by the user inputting an instruction or automatically when the end of the content is reached. If the reproduction of the content is not stopped, the processing of step S304 and steps that follow step S304 is repeated to deal with the case where the user changes the reproduction condition of the reproduced content. If the reproduction is stopped, the above-described controlling process is stopped. The foregoing process is a controlling process for changing the reproduction condition of the content.

Note that a frame selected by the reproduced frame selecting portion 102 is supplied to the reproduction condition adding portion 103. The reproduction condition adding portion 103 outputs the supplied frame to the display portion 104 as it is and also performs processing for saving the reproduction condition designated for the reproduced moving image data in accordance with a user operation of the reproduction condition setting portion 110.

As an example, a determination as to whether or not to save the state in which moving image data has been reproduced is made in advance by a user operation of the reproduction condition setting portion 110. In accordance with the determination result, the reproduction condition adding portion 103 adds information about a reproduced frame selected by the reproduced frame selecting portion 102 to corresponding moving image data stored in the recording portion 101. It is conceivable that the information about the reproduced frame is saved in association with, for example, a header or a footer of frame data in the moving image data that is being reproduced. This is not a limitation, and the information about the reproduced frame can also be managed as data separate from the moving image data, in association with the frame of the moving image data. Moreover, the reproduction condition adding portion 103 can save information that specifies a frame selected by the reproduced frame selecting portion 102 in association with the exposure condition of that frame.

The display portion 104 outputs frames supplied from the reproduction condition adding portion 103 as reproduced moving image data having a reproducing frame rate. For example, the display portion 104 temporally accumulates selected frames in a buffer that is not shown, reads out the accumulated frames in the buffer at the reproducing frame rate, and outputs the frames as the reproduced moving image data.

In this manner, by saving the state in which moving image data has been reproduced, when that moving image data is reproduced again, the state in which the moving image data has been reproduced by the reproduced frame selecting portion 102 can be easily replicated by referring to the information about reproduced frames associated with that moving image data on a frame-by-frame basis.

As described above, according to the first embodiment of the present invention, when a plurality of frames obtained by capturing images within the period of a single reproduced frame while changing the exposure condition is reproduced from a recording medium, the reproduction can be performed at a brightness designated by the user.

Note that in the foregoing description, in the case where the reproduction condition is not designated by a user operation of the reproduction condition setting portion 110, a properly exposed (0) frame is selected. However, this is not limited to this example, and an underexposed (−1) or overexposed (+1) frame may also be selected.

Moreover, in the foregoing description, the moving image data stored in the recording portion 101 is obtained by repeatedly capturing and recording images in three sequential states of underexposure (−1), proper exposure (0), and overexposure (+1). However, this is not limited to this example. The moving image data recorded in the recording portion 101 may also be obtained by sequentially capturing images at exposure levels, for example, from (−3) to (+3) on a frame-by-frame basis.

Furthermore, in the foregoing description, it is assumed that the recording frame rate of the moving image data stored in the recording portion 101 is 180 fps and the reproducing frame rate of the reproduced moving image data output to the display portion 104 is 60 fps. However, this is not limited to this example. That is to say, when the moving image data stored in the recording portion 101 is moving image data obtained by capturing images at a higher frame rate than the reproducing rate and under a wider variety of exposure conditions, the range of choices of the exposure level at which reproduction is desired is also extended. Thus, the variation of the amount of change in the brightness during reproduction also increases, which makes it possible to change the brightness stepwise.

Second Embodiment

Next, a second embodiment of the present invention will be described. According to the second embodiment, in the case where an attention area is selected by the user, an optimum frame is automatically selected in accordance with the brightness of an image in that attention area.

Figure 4:
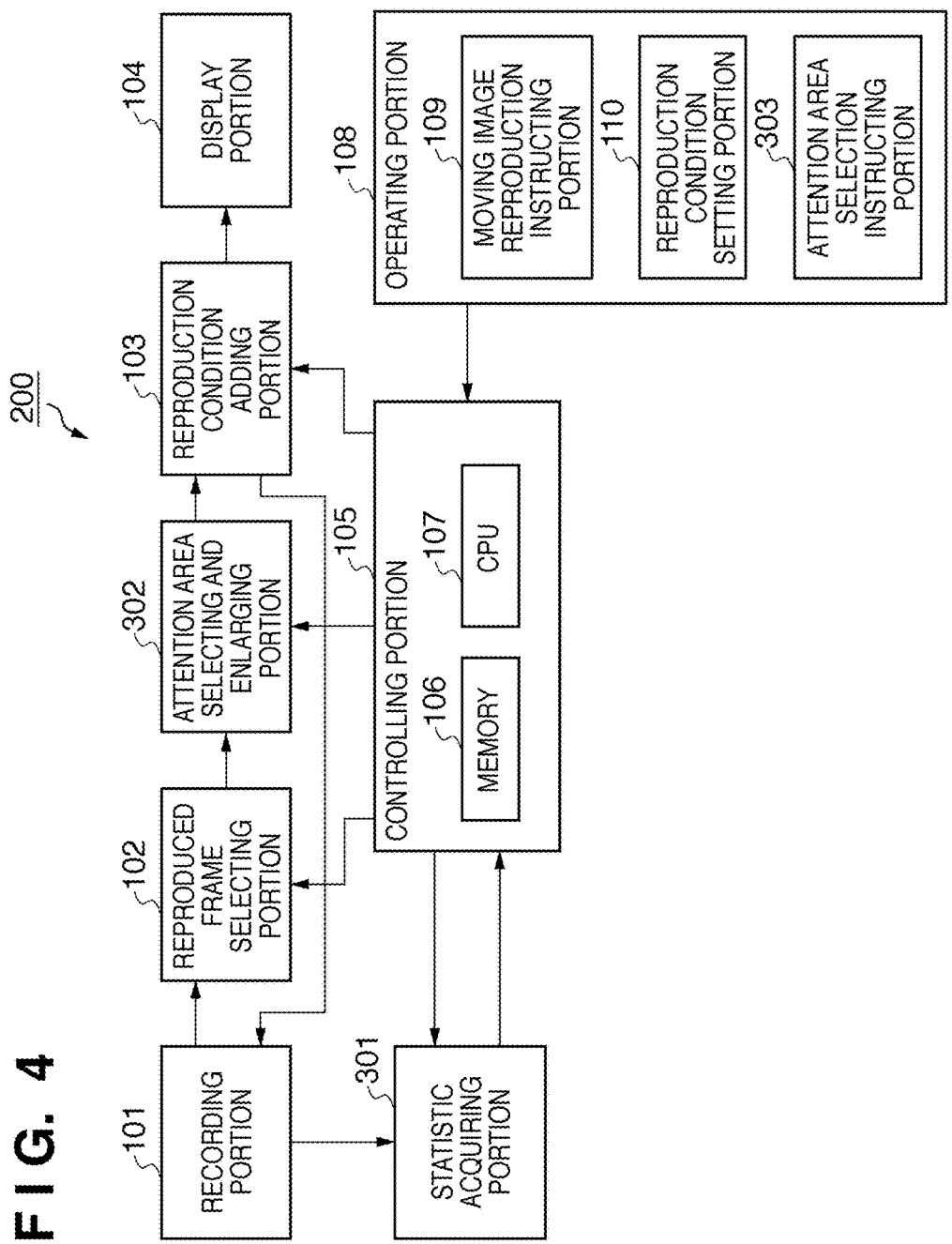
FIG. 4 is a block diagram showing an exemplary configuration of a reproducing apparatus that is applicable to a second embodiment of the present invention.

FIG. 4 shows an exemplary configuration of a reproducing apparatus 200 that is applicable to the second embodiment of the present invention. Note that in FIG. 4, portions that are common with those in the reproducing apparatus 100 shown in FIG. 1 described above are denoted by the same reference numerals, and a detailed description thereof will be omitted.

In the reproducing apparatus 200 shown in FIG. 4, a statistic acquiring portion 301, an attention area selecting and enlarging portion 302, and an attention area selection instructing portion 303 are added to the reproducing apparatus 100 shown in FIG. 1. The statistic acquiring portion 301 acquires a predetermined statistic based on a characteristic of an image. The attention area selection instructing portion 303 serving as an accepting unit provides an instruction to select an attention area in a displayed image generated from moving image data reproduced from the recording portion 101, in accordance with a user operation of the operating portion 108. The attention area selecting and enlarging portion 302 serving as a frame generating unit selects an attention area, the selection of which has been instructed by the attention area selection instructing portion 303, and enlarges the attention area for each frame of the moving image data supplied from the reproduced frame selecting portion 102.

Figure 5:
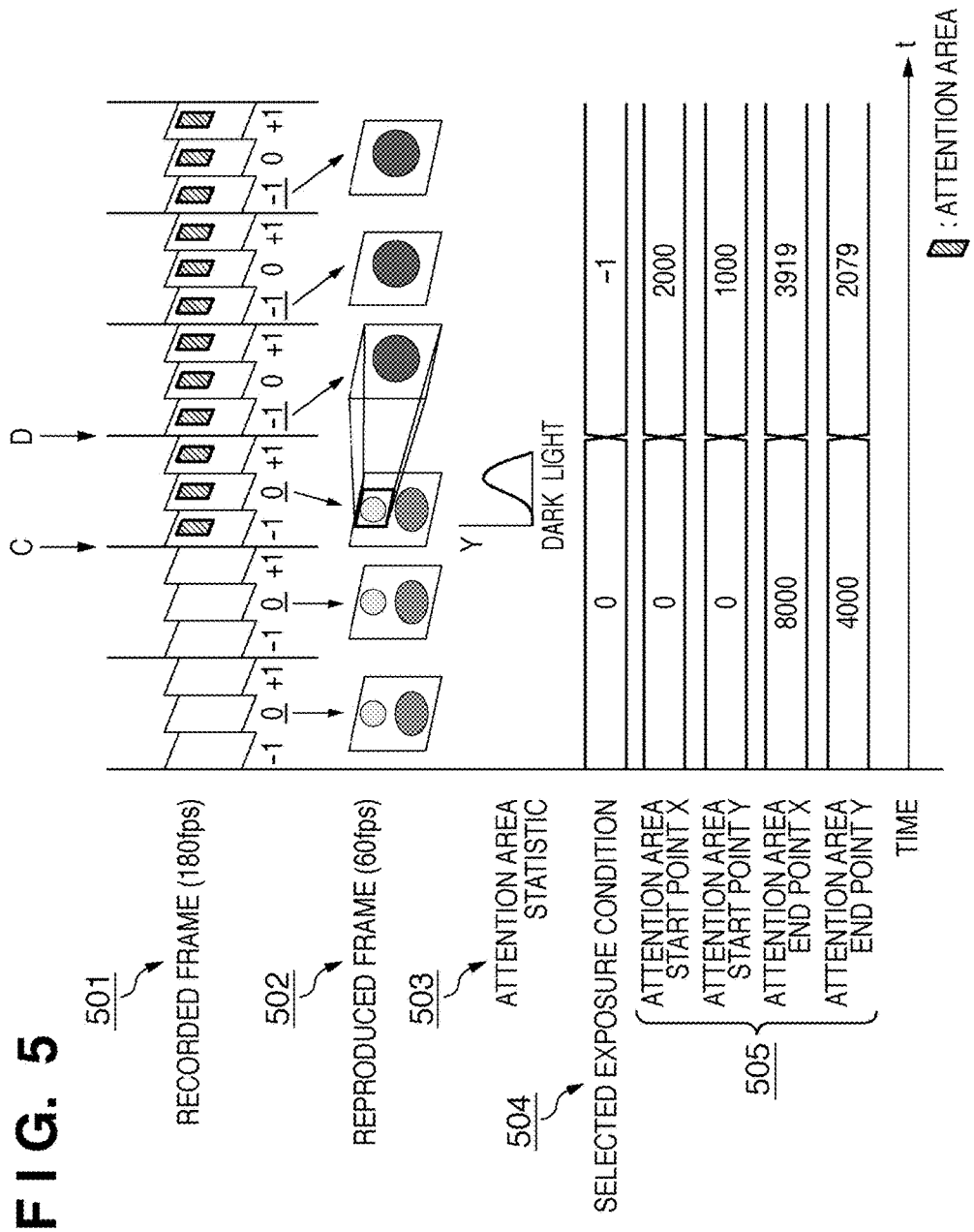
FIG. 5 is a diagram showing an exemplary relationship between moving image data saved in the recording portion and a frame to be output to the display portion according to the second embodiment of the present invention, with the horizontal axis representing time.

FIG. 5 shows an exemplary relationship between the moving image data saved in the recording portion 101 and a frame to be output to the display portion 104, with the horizontal axis representing time. An example of the moving image data stored in the recording portion 101 is indicated by reference numeral 501 in FIG. 5, and an example of an area in a reproduced frame selected by the attention area selecting and enlarging portion 302 is indicated by reference numeral 502 in FIG. 5.

In this example, it is assumed that the moving image data stored in the recording portion 101 is recorded at a frame rate of 180 fps and has an image size of 8000 pixels×4000 pixels. On the other hand, the moving image data output to the display portion 104 is reproduced at a frame rate of 60 fps. That is to say, the moving image data stored in the recording portion 101 has been obtained by capturing three frames per period of a single reproduced frame while changing the exposure condition. It is assumed here that, as indicated by reference numeral 501 in FIG. 5 by way of example, the moving image data stored in the recording portion 101 has been obtained by repeatedly capturing images at exposure levels from (−1) to (+1) in the order of underexposure (−1), proper exposure (0), and overexposure (+1) on a frame-by-frame basis. Note that it is assumed that information indicating the exposure condition such as underexposure, proper exposure, and overexposure is stored in the recording portion 101 in association with each frame of the moving image data.

Figure 6:
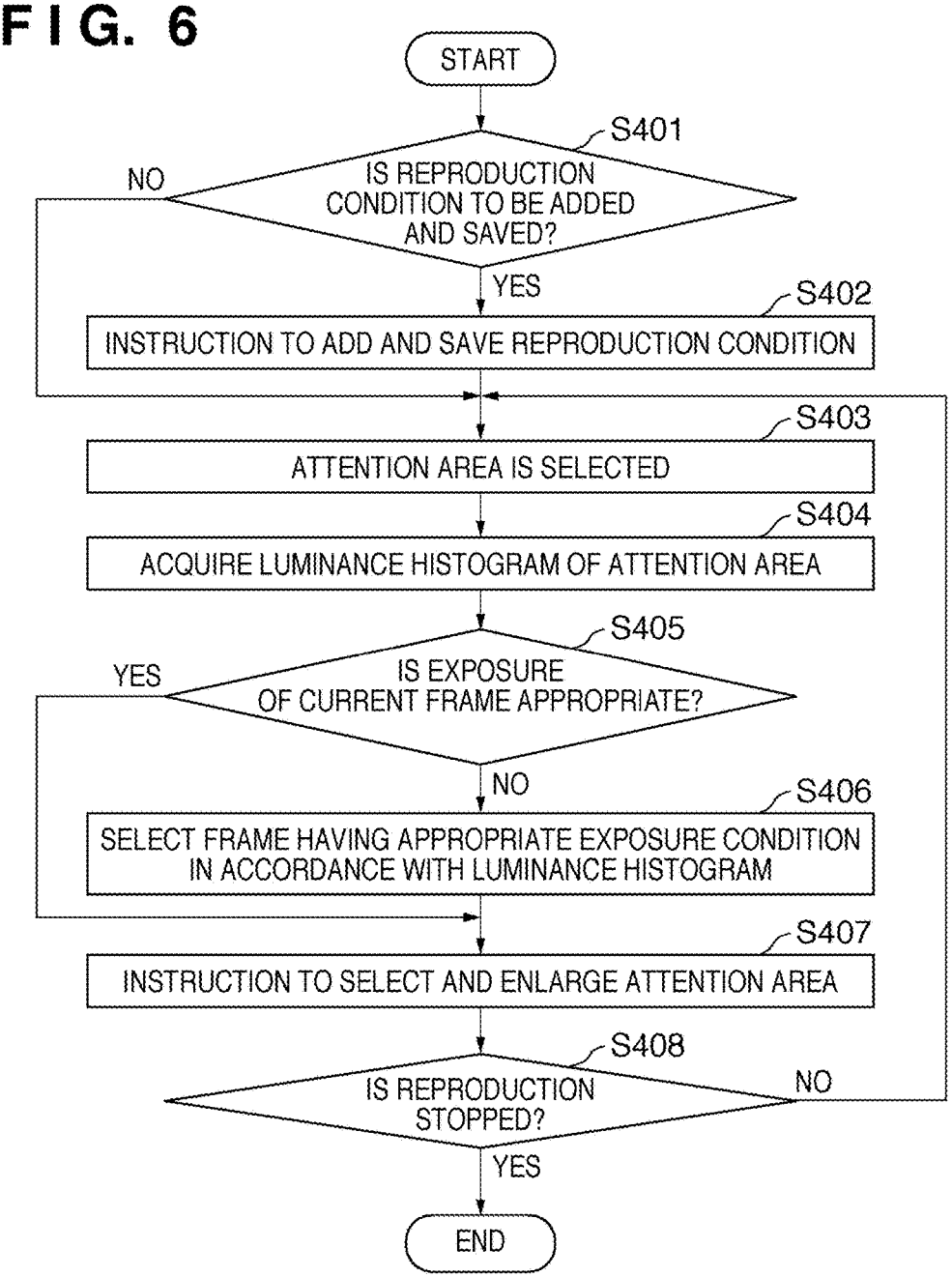
FIG. 6 is a flowchart showing an exemplary reproduction process according to the second embodiment of the present invention.

FIG. 6 is a flowchart showing an exemplary reproduction process according to the second embodiment. Each process step of the flowchart in FIG. 6 is performed by a program executed by the CPU 107 of the controlling portion 105.

Prior to the process of the flowchart in FIG. 6, reproduction of the moving image data stored in the recording portion 101 is instructed by the moving image reproduction instructing portion 109 of the operating portion 108 in accordance with a user operation. Here, as described above, the moving image data stored in the recording portion 101 is recorded at a frame rate of 180 fps and reproduced at a frame rate of 60 fps when output to the display portion 104. The reproduced frame selecting portion 102 selects one frame having an appropriate exposure condition per period of a single reproduced frame of the moving image data reproduced from the recording portion 101 in response to the reproduction instruction. Here, it is assumed that properly exposed (0) frames are selected.

The frames selected by the reproduced frame selecting portion 102 are supplied to the reproduction condition adding portion 103 via the attention area selecting and enlarging portion 302. The reproduction condition adding portion 103 outputs the supplied frames to the display portion 104 as they are and, in accordance with a user operation of the reproduction condition setting portion 110, performs processing for saving a reproduction condition designated for that reproduced moving image data in the above-described manner.

Returning to the flowchart in FIG. 6, when the reproduction of the moving image data is started, the controlling portion 105 determines whether or not it is preset in the reproduction condition setting portion 110 that the reproduction condition is to be added and saved (step S401). If it is determined that it is set that the reproduction condition is not to be added, the process is advanced to step S403.

On the other hand, if it is determined that it is set that the reproduction condition is to be added, the process is advanced to step S402. In step S402, the controlling portion 105 instructs the reproduction condition adding portion 103 to add the reproduction condition to the moving image data and save the reproduction condition. When receiving this instruction, the reproduction condition adding portion 103 adds the reproduction condition to each frame and stores the reproduction condition in the recording portion 101. The reproduction condition can be added to, for example, a header or a footer of a corresponding frame. This is not a limitation, and the reproduction condition can also be managed as data separate from the moving image data.

After the addition and saving of the reproduction condition is performed in step S402, the process is advanced to step S403. In step S403, the attention area selection instructing portion 303 selects an attention area in an image of a frame supplied from the reproduced frame selecting portion 102, in accordance with a user operation of the attention area selection instructing portion 303. In the example shown in FIG. 5, an attention area is selected at time C as indicated by reference numeral 505 in FIG. 5 by way of example. That is to say, when the coordinates (x, y) of an image of a frame are expressed in units of pixels, the entire image is within a range of (0, 0)-(8000, 4000). In the present embodiment, it is assumed that an area defined by the coordinates (2000, 1000)-(3919, 2079) is selected as the attention area. The coordinates of this selected attention area are treated as a reproduction condition of the moving image data. That is to say, the reproduction condition adding portion 103 serving as an area information saving unit stores the coordinates of this selected attention area into the recording portion 101 as a reproduction condition in association with the frame. The controlling portion 105 supplies attention area information indicating the selected attention area to the statistic acquiring portion 301.

The process is advanced to step S404, and the statistic acquiring portion 301 acquires a characteristic within the attention area indicated by the attention area information for an image of each frame of the moving image data reproduced from the recording portion 101. Here, it is assumed that a luminance characteristic, more specifically, a luminance histogram, based on luminance values of individual pixels in the attention area is acquired. An example of the acquired luminance histogram is indicated by reference numeral 503 in FIG. 5. In this example, a luminance histogram acquired for an image of a frame selected by the reproduced frame selecting portion 102 immediately after time C is shown. Information about the acquired luminance histogram is supplied to the controlling portion 105.

The process is advanced to the next step S405, and the controlling portion 105 determines whether or not the exposure condition of a frame that is currently being selected is appropriate on the basis of the acquired luminance histogram. For example, the controlling portion 105 determines that the exposure condition is appropriate if the distribution of the luminance histogram of the selected attention area is not skewed either in the direction of higher luminances or in the direction of lower luminances. Moreover, the controlling portion 105 determines that the exposure condition is not appropriate if the distribution of that luminance histogram is skewed in at least one of the direction of higher luminances and the direction of lower luminances. If it is determined that the exposure condition is appropriate, the process is advanced to step S407.

On the other hand, in step S405, if it is determined that the exposure condition of the frame that is currently being selected is not appropriate, the process is advanced to step S406. In step S406, the controlling portion 105 determines the lightness and darkness of the attention area on the basis of the acquired luminance histogram of the attention area and selects an exposure level corresponding to an appropriate exposure condition in accordance with the determination result. This can be realized by classifying the shapes of the luminance histogram into several patterns and presetting an exposure level to be selected for each pattern. Then, the controlling portion 105 instructs the reproduced frame selecting portion 102 to select a frame having that appropriate exposure condition.

Specifically, in the case where video has a high pixel count for tones on the higher luminance side, there is a possibility that the highlights are clipped in the video;

therefore, a more underexposed (−1) frame than the frame that is currently being output to the display portion 104 is selected as a frame having an appropriate exposure condition. On the other hand, in the case where video has a high pixel count for tones on the lower luminance side, there is a possibility that the shadows are clipped in the video; therefore a more overexposed (+1) frame than the frame that is currently being output to the display portion 104 is selected as a frame having an appropriate exposure condition.

In the example indicated by reference numeral 503 in FIG. 5, since the pixel count for tones on the higher luminance side is high, underexposed (−1) frames are selected and output to the display portion 104 after time D corresponding to the next frame for which the statistic is acquired (see reference numeral 504 in FIG. 5). Note that the exposure condition selected here is treated as a reproduction condition. That is to say, the reproduction condition adding portion 103 serving as an exposure condition saving unit stores this selected exposure condition into the recording portion 101 as a reproduction condition in association with the frames.

After a frame having an appropriate exposure condition is selected, the process is advanced to the next step S407. In step S407, the controlling portion 105 transmits attention area information to the attention area selecting and enlarging portion 302 and issues an instruction to enlarge the attention area in an image of the frame. In the attention area selecting and enlarging portion 302, the attention area in the image of the frame supplied from the reproduced frame selecting portion 102 is enlarged on the basis of the attention area information transmitted from the controlling portion 105. Then, a frame composed of an image of the enlarged attention area is generated and output to the reproduction condition adding portion 103. That is to say, the original image is cropped to the attention area, enlarged to a single-frame image size, and output as a frame.

Note that in the case where a user operation of the attention area selection instructing portion 303 for selecting the attention area is not performed or in the case where the selected attention area is reset, the attention area selecting and enlarging portion 302 outputs the supplied frame as it is.

In step S408, the controlling portion 105 determines whether or not a request to stop the reproduction of the moving image data is issued from the moving image reproduction instructing portion 109. For example, if a request to stop the reproduction is transmitted from the moving image reproduction instructing portion 109 to the controlling portion 105 in accordance with a user operation, the controlling portion 105 stops the reproduction of the moving image data stored in the recording portion 101 and terminates a series of process steps. On the other hand, if it is determined that a request to stop the reproduction is not issued, the process is returned to step S403. Of course, as the video proceeds, the values in the luminance histogram of the attention area change. For this reason, in some cases, a frame having an exposure level that is currently selected may not have a proper brightness. In the present embodiment, since processing from steps S404 to S406 is repeated whenever needed until the reproduction is stopped, a frame having a proper exposure condition can be selected for each frame to be displayed. Moreover, also in the case where the attention area is changed during reproduction, a frame having a proper exposure condition can be selected and displayed by performing the above-described processing.

As described above, according to the second embodiment, in the case where an attention area in images of a plurality of frames captured within the period of a reproduced frame while changing the exposure condition is selected, the luminance histogram of the selected attention area is acquired, and a frame having an appropriate exposure condition is selected on the basis of this luminance histogram. Thus, reproduction can be performed at a brightness suited to an image of the selected attention area. The exposure condition of a recorded frame has been changed for the entire screen, and therefore, even in the case of an image of a frame that is determined to be properly exposed, a region in which the shadows are clipped or a region in which the highlights are clipped may be present in that frame image. Accordingly, an area selected by the user from within the frame image is not necessarily properly exposed. Even in such a case, the present embodiment makes it possible to display an image having a more appropriate brightness when an attention area selected by the user is displayed.

Note that the higher the resolution (the larger the image size) of an image from the moving image data to be reproduced, the more it is possible to crop and reproduce a moving image having a sufficiently high resolution even when attention is focused on an area at which that image is present. Moreover, an editing operation can be made simple by recording also the coordinates of the cropped area as a reproduction condition.

Note that in the above-described first and second embodiments, a single frame is selected out of the recorded frames and displayed; however, a single frame image generated by combining a plurality of frames can also be used. For example, by using underexposed (−1) and properly exposed (0) frames, an image at an exposure level between underexposure (−1) and proper exposure (0) can be generated. In this manner, by using a process of combining recorded frames, a more precise exposure level than the actual exposure condition can be selected. In the case of the first embodiment, the user can select the brightness more minutely. In the case of the second embodiment, the image of the attention area can be made an image having a more appropriate brightness.

Third Embodiment

Next, a third embodiment of the present invention will be described. In the first and second embodiments, a frame having an intended brightness is immediately selected and displayed in response to an instruction from the user or on the basis of a luminance histogram. In contrast, in the third embodiment, the brightness of a moving image is changed stepwise toward a target brightness by employing the above-described combining process that uses a plurality of recorded frames. Thus, smooth moving image reproduction can be realized, and the brightness of a moving image that is being reproduced can be changed to the target brightness. Note that this process can be applied to the above-described first and second embodiments. Here, a case where this process is applied to the second embodiment will be described.

Figure 7:
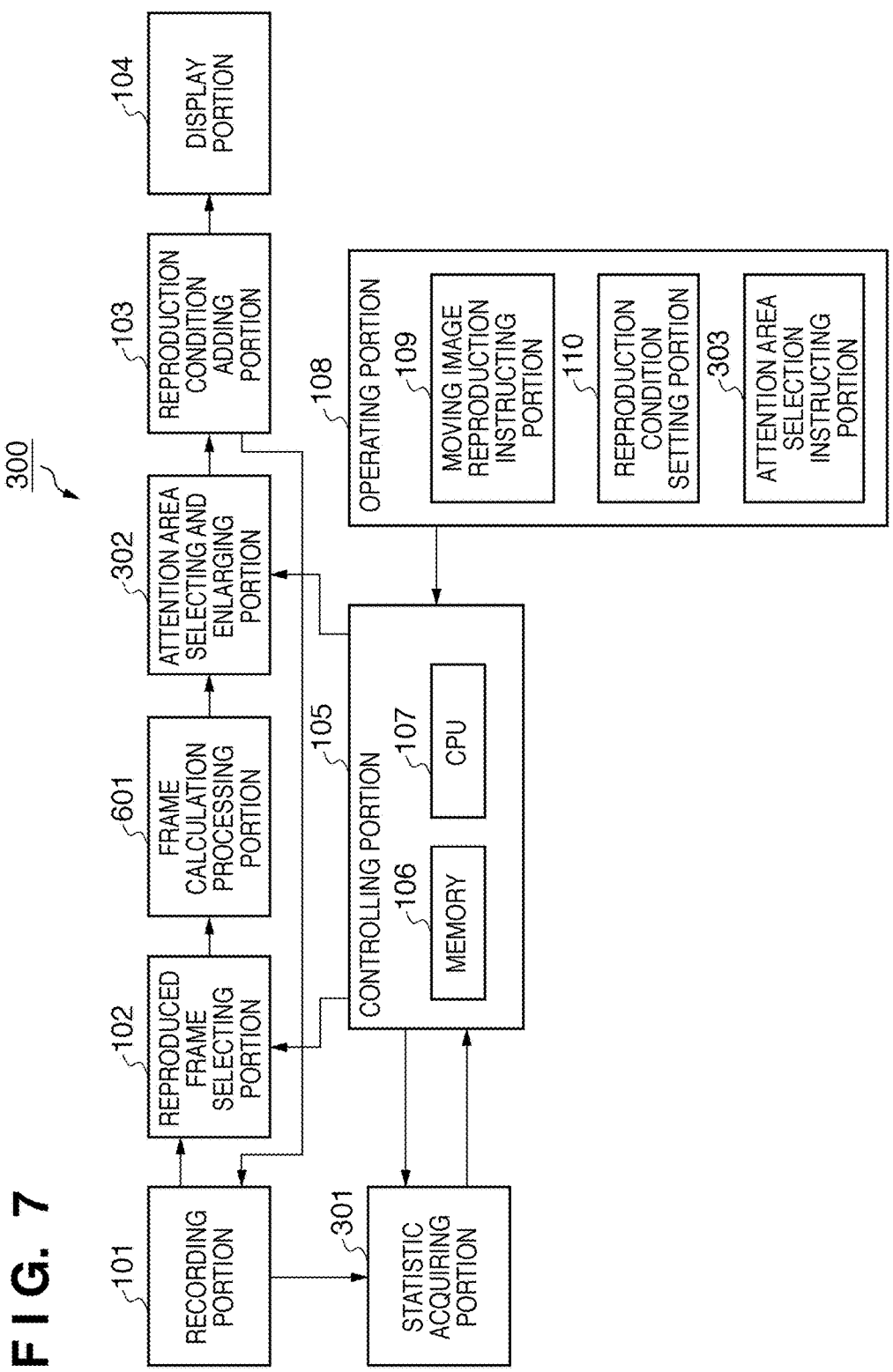
FIG. 7 is a block diagram showing an exemplary configuration of a reproducing apparatus that is applicable to a third embodiment of the present invention.

FIG. 7 shows an exemplary configuration of a reproducing apparatus 300 that is applicable to the third embodiment of the present invention. Note that in FIG. 7, portions that are common with those in the reproducing apparatus 100 and the reproducing apparatus 200 respectively shown in FIGS. 1 and 4 described above are denoted by the same reference numerals, and a detailed description thereof will be omitted.

In the reproducing apparatus 300 shown in FIG. 7, a frame calculation processing portion 601 is added to the reproducing apparatus 200 shown in FIG. 4. In the third embodiment, the reproduced frame selecting portion 102 selects a plurality of frames, that is, two or more frames per period of a single reproduced frame. The frame calculation processing portion 601 serving as a frame combining unit performs a predetermined calculation process, such as a cumulative addition process or a weighted average process, on the two or more frames supplied from the reproduced frame selecting portion 102. Then, a single frame is generated through this calculation process and output to the attention area selecting and enlarging portion 302.

Figure 8:
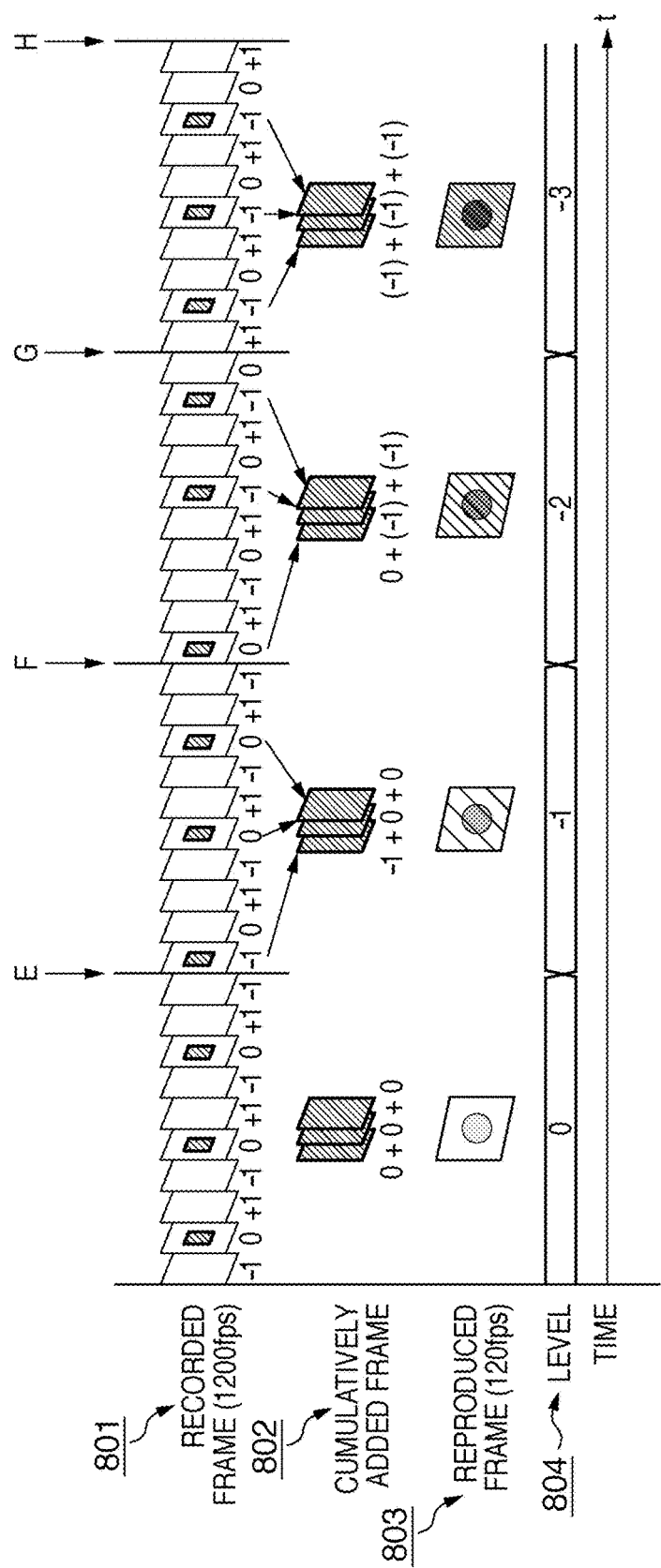
FIG. 8 is a diagram showing an exemplary relationship between moving image data saved in the recording portion and a frame to be output to the display portion according to the third embodiment of the present invention, with the horizontal axis representing time.

FIG. 8 shows an exemplary relationship between moving image data saved in the recording portion 101 and a frame to be output to the display portion 104, with the horizontal axis representing time. An example of the moving image data stored in the recording portion 101 is indicated by reference numeral 801 in FIG. 8, and an example of the frame to be output is indicated by reference numeral 803 in FIG. 8.

In this example, it is assumed that the moving image data stored in the recording portion 101 is recorded at a frame rate of 1200 fps and has an image size of 8000 pixels×4000 pixels. On the other hand, it is assumed that the moving image data output to the display portion 104 is reproduced at a frame rate of 120 fps. That is to say, the moving image data stored in the recording portion 101 has been obtained by capturing ten frames per period of a single reproduced frame while changing the exposure condition. Here, it is assumed that, as indicated by reference numeral 801 in FIG. 8 by way of example, the moving image data stored in the recording portion 101 has been obtained by repeatedly capturing images at exposure levels from (−1) to (+1) in the order of underexposure (−1), proper exposure (0), and overexposure (+1) on a frame-by-frame basis. Note that it is assumed that information indicating the exposure condition such as underexposure, proper exposure, and overexposure is stored in the recording portion 101 in association with each frame of the moving image data.

Figure 9:
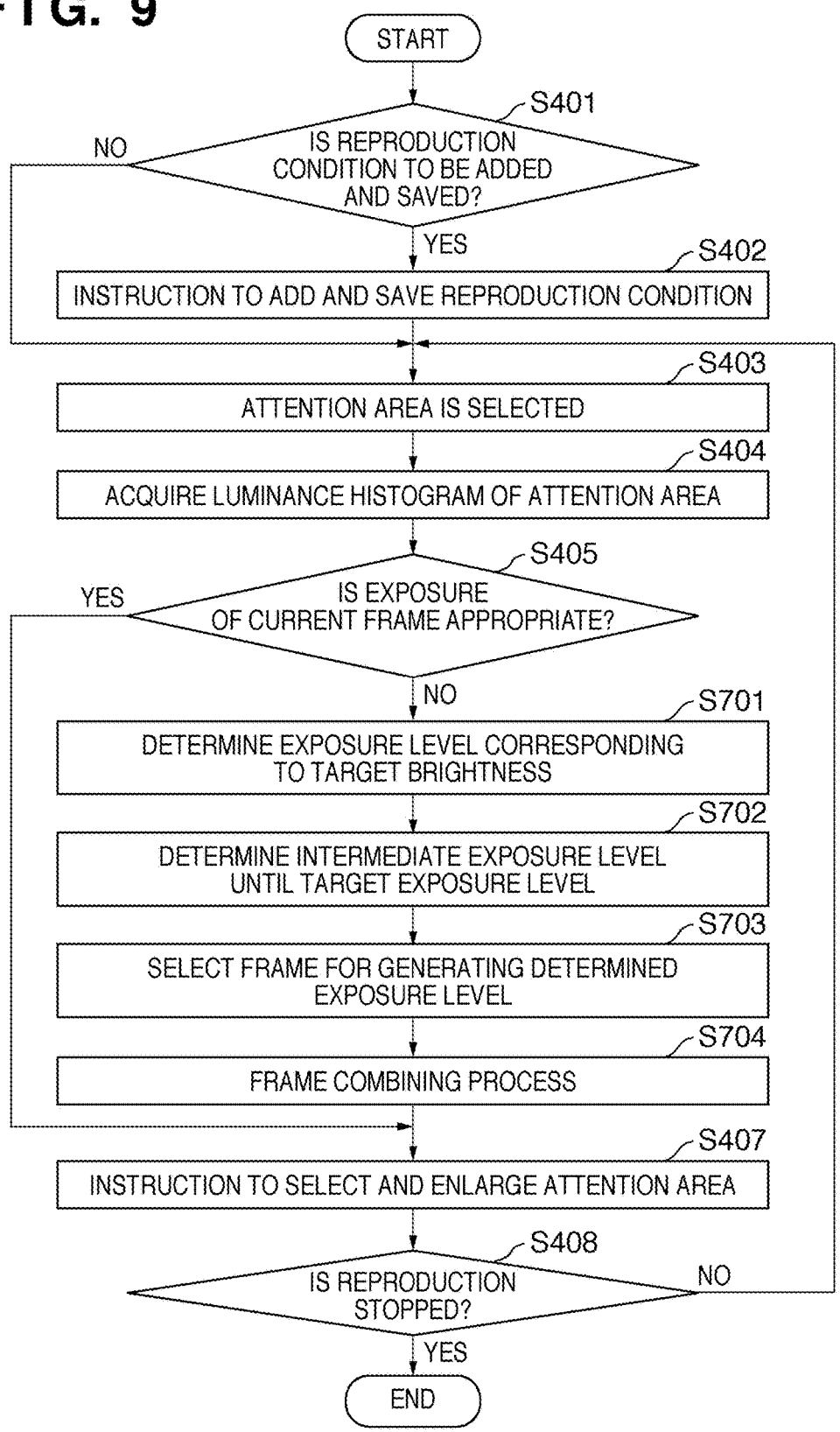
FIG. 9 is a flowchart showing an exemplary reproduction process according to the third embodiment of the present invention.

FIG. 9 is a flowchart showing an exemplary reproduction process according to the third embodiment of the present invention. Each process step of the flowchart in FIG. 9 is performed by a program executed by the CPU 107 of the controlling portion 105. Note that in the flowchart in FIG. 9, process steps that are common with those of the flowchart in FIG. 6 described above are denoted by the same reference numerals, and a detailed description thereof will be omitted. That is to say, processing of steps S401 to S405 and processing of steps S407 and S408 of the flowchart in FIG. 9 is common with that of the flowchart in FIG. 6. Moreover, since the moving image data reproduction process that is performed prior to the process of the flowchart in FIG. 9 is the same as the process already described in the above second embodiment, a description thereof will be omitted here.

Hereinafter, process steps of the flowchart in FIG. 9 that are different from those of the flowchart in FIG. 6 described above will be described. In step S404, a luminance histogram of a selected attention area is acquired, and in step S405, if it is determined that the exposure condition is not appropriate, the process is advanced to step S701.

In step S701, the controlling portion 105 determines an exposure level corresponding to a target brightness on the basis of the luminance histogram acquired in step S404. Next, in step S702, the controlling portion 105 determines an intermediate exposure level for display until the determined target exposure level is reached. For example, in the case where the exposure level of a current frame is +1 and the target exposure level is −1, values +0.5, 0, and −0.5 are determined as intermediate exposure levels. The determination of an intermediate exposure level can be made as appropriate on the basis of conditions such as the difference between the exposure level of the current frame and the target exposure level, the individual exposure condition of each frame, the time (the number of frames to be displayed) required for the target exposure level to be reached, and the like.

Subsequently, in step S703, the controlling portion 105 supplies an instruction to select frames that are used to achieve the exposure level determined in steps S701 and S702 out of the frames within the period of a single reproduced frame to the reproduced frame selecting portion 102. More specifically, the controlling portion 105 selects frames so as to achieve the intermediate exposure level determined in step S702. At this time, in the case where the exposure condition of a single frame matches the intermediate exposure level, only the single frame can be selected from within the period of a single reproduced frame. Moreover, in the case where the exposure condition of a single frame does not match the intermediate exposure level, a frame corresponding to the intermediate exposure level is generated by selecting a plurality of frames from within the period of a single reproduced frame and combining these frames.

In the example shown in FIG. 8, three frames are selected out of the ten frames within the period of a single reproduced frame and cumulatively added to generate a single frame corresponding to the intermediate exposure level. An example of the case where the brightness of images of generated frames is darkened stepwise (see reference numeral 803 in FIG. 8) will be described. Note that "Level" indicated by reference numeral 804 in FIG. 8 is an exposure level that is a numerical representation of the brightness of an image, and it is assumed that the larger the numerical value, the brighter the image, and the smaller the numerical value, the darker the image.

As an example, as indicated by reference numeral 804 in FIG. 8 by way of example, the case where the brightness of images is decreased from a numerical value (0) to a numerical value (−3) will be considered. In this case, it is conceivable that the brightness of the images is decreased stepwise, for example, from the numerical value (0) to a numerical value (−1), a numerical value (−2), and then the numerical value (−3). Note that it is assumed here that the numerical value (−3) corresponds to the brightness of an underexposed (−1) image, and the numerical value (0) corresponds to the brightness of a properly exposed (0) image.

More specifically, in a period from time E to time F, a plurality of frames in such a combination that the numerical value becomes (−1) is selected. Next, in a period from time F to time G, a plurality of frames in such a combination that the numerical value becomes (−2) is selected. Then, after time G, a plurality of frames in such a combination that the numerical value becomes (−3), which is the target brightness, is selected.

As an example, in the period from time E to time F in FIG. 8, three frames are selected out of the ten frames within a corresponding period of a single reproduced frame so that the numerical value becomes (−1). For example, as indicated by reference numeral 802 in FIG. 8 by way of example, the frames are selected in a combination of one underexposed (−1) frame and two properly exposed (0) frames. In the period from time F to time G in FIG. 8, three frames are selected out of the ten frames within a corresponding period of a single reproduced frame so that the numerical value becomes (−2). For example, as indicated by reference numeral 802 in FIG. 8 by way of example, the frames are selected in a combination of two underexposed (−1) frames and one properly exposed (0) frame. Moreover, in the period from time G to time H in FIG. 8, three frames are selected out of the ten frames within a corresponding period of a single reproduced frame so that the numerical value becomes (−3). For example, as indicated by reference numeral 802 in FIG. 8 by way of example, three underexposed (−1) frames are selected.

Note that various methods for determining which frames are to be selected out of a plurality of frames included in the period of a single reproduced frame are conceivable. For example, it is conceivable to determine the frames to be selected for each of multiple consecutive periods of a reproduced frame so that the intervals between the selected frames are as uniform as possible.

After the selection of frames is completed, the process is advanced to step S704. In step S704, a plurality of frames selected within the period of a single reproduced frame is supplied from the reproduced frame selecting portion 102 to the frame calculation processing portion 601. The frame calculation processing portion 601 cumulatively adds the plurality of frames supplied. The addition of the frames is performed by, for example, adding pixel values of pixels in a frame to be added to respective pixel values of corresponding pixels in a frame to which that frame is added. Then, the resulting sums are divided by the number of frames added together to generate a single frame. This process for generating a single frame by cumulative addition of a plurality of frames is performed while resetting the result of the addition for each period of a single reproduced frame. It goes without saying that in the case where the number of frames selected within the period of a single reproduced frame is one, the adding process is not performed.

This frame generated by the frame calculation processing portion 601 using cumulative addition is supplied to the attention area selecting and enlarging portion 302. Thereafter, in step S407, processing for selecting and enlarging an attention area is performed in accordance with a user operation, and in step S408, it is determined whether or not an instruction to stop the reproduction is issued. If it is determined that an instruction to stop the reproduction is issued, the operation of reproducing the moving image data from the recording portion 101 is stopped, and a series of process steps is terminated. On the other hand, if it is determined that an instruction to stop the reproduction is not issued, the process is returned to step S403.

As described above, according to the third embodiment, when a plurality of frames obtained by capturing images within the period of a single reproduced frame while changing the exposure condition is reproduced, a plurality of frames is selected per period of a single reproduced frame and combined into a single frame, and then the single frame is output. Thus, the brightness can be smoothly changed to that of a target frame, and as a result, display can be performed with less discomfort.

Note that in the third embodiment, a plurality of frames is cumulatively added in the frame calculation processing portion 601; however, this is not limited to this example. For example, it is also possible to calculate a weighted average of all the frames within the period of a single reproduced frame and generate a single reproduced frame on the basis of the calculation results. In that case, the weight assigned to each frame is set so that a frame having the obtained intermediate exposure level is generated from frames having each of the exposure conditions that have been input during the determination of an intermediate exposure level in step S702. In this manner, a moving image with more favorable image quality than that generated simply by cumulatively adding a plurality of frames can be generated.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-044324, filed on Feb. 26, 2009, which is hereby incorporated by reference herein in its entirety.

What is claimed is:

1. An image output apparatus comprising:
   a selecting unit configured (a) to select at least one image data among a plurality of image data stored in a storage unit, and (b) to output, to a display unit, a display image based on the selected image data; and
   an acquiring unit configured to acquire a characteristic corresponding to a partial area of the display image displayed by the display unit, in response to a designation, by a user, of the partial area of the display image,
   wherein the selecting unit is configured to select at least one image data among the plurality of image data based on the characteristic corresponding to the partial area designated by the user.

2. The image output apparatus according to claim 1, wherein the plurality of image data is one set of plural image data continuously captured.

3. The image output apparatus according to claim 1, wherein the selecting unit is configured to select one image data among the plurality of image data based on the characteristic corresponding to the partial area.

4. The image output apparatus according to claim 1, wherein the selecting unit is further configured to enlarge the partial area of the display image.

5. The image output apparatus according to claim 1, wherein the characteristic includes an image characteristic.

6. The image output apparatus according to claim 5, wherein the image characteristic includes a brightness characteristic.

7. The image output apparatus according to claim 6, wherein the selecting unit is further configured to change brightness of the display image by selecting at least one image data among the plurality of image data based on the brightness characteristic corresponding to the partial area.

8. The image output apparatus according to claim 1, wherein the selecting unit is further configured to select at least two image data among the plurality of image data based on the characteristic corresponding to the partial area, and to combine the at least two image data by performing a weighted combining process.

9. The image output apparatus according to claim 1, wherein the plurality of image data is generated by capturing a plurality of images with a plurality of capturing conditions which are respectively different from each other.

10. A method comprising:
selecting at least one image data among a plurality of image data stored in a storage unit;
outputting, to a display unit, a display image based on the selected at least one image data;
acquiring a characteristic corresponding to a partial area of the display image displayed by the display unit, in response to a designation, by a user, of the partial area of the display image; and
selecting at least one image data among the plurality of image data based on the characteristic corresponding to the partial area designated by the user.

11. A non-transitory computer-readable storage medium storing a computer-executable program for implementing a method, the method comprising:
selecting at least one image data among a plurality of image data stored in a storage unit;
outputting, to a display unit, a display image based on the selected at least one image data;
acquiring a characteristic corresponding to a partial area of the display image displayed by the display unit, in response to a designation, by a user, of the partial area of the display image; and
selecting at least one image data among the plurality of image data based on the characteristic corresponding to the partial area designated by the user.

12. The non-transitory computer-readable storage medium according to claim 11, wherein the plurality of image data is one set of plural image data continuously captured.

13. The non-transitory computer-readable storage medium according to claim 11, wherein the selecting is configured to select one image data among the plurality of image data based on the characteristic corresponding to the partial area.

14. The non-transitory computer-readable storage medium according to claim 11, wherein the selecting is further configured to enlarge the partial area of the display image.

15. The non-transitory computer-readable storage medium according to claim 11, wherein the characteristic includes an image characteristic.

16. The non-transitory computer-readable storage medium according to claim 15, wherein the image characteristic includes a brightness characteristic.

17. The non-transitory computer-readable storage medium according to claim 16, wherein the selecting is further configured to change brightness of the display image by selecting at least one image data among the plurality of image data based on the brightness characteristic corresponding to the partial area.

18. The non-transitory computer-readable storage medium according to claim 11, wherein the selecting is further configured to select at least two image data among the plurality of image data based on the characteristic corresponding to the partial area, and to combine the at least two image data by performing a weighted combining process.

19. The non-transitory computer-readable storage medium according to claim 11, wherein the plurality of image data is generated by capturing a plurality of images with a plurality of capturing conditions which are respectively different from each other.

20. An image output apparatus comprising:
a selecting unit configured (a) to select at least one image data among a plurality of image data stored in a storage unit, and (b) to output, to a display unit, a first display image based on the selected image data; and
an acquiring unit configured to acquire a characteristic corresponding to a partial area of a second display image displayed by the display unit, in response to a designation, by a user, of the partial area of the second display image,
wherein the selecting unit is configured to select the at least one image data among the plurality of image data based on the characteristic corresponding to the partial area designated by the user.

21. A non-transitory computer-readable storage medium storing a computer-executable program for implementing a method, the method comprising:
selecting at least one image data among a plurality of image data stored in a storage unit;
outputting, to a display unit, a first display image based on the selected at least one image data; and
acquiring a characteristic corresponding to a partial area of a second display image displayed by the display unit, in response to a designation, by a user, of the partial area of the second display image,
wherein the selecting is configured to select the at least one image data among the plurality of image data based on the characteristic corresponding to the partial area designated by the user.

22. The image output apparatus according to claim 3, wherein the selecting unit is further configured to enlarge the partial area of the display image.

23. The non-transitory computer-readable storage medium according to claim 13, wherein the selecting is further configured to enlarge the partial area of the display image.

24. An image output apparatus comprising:
a selecting unit configured (a) to select at least one image data among a plurality of image data stored in a storage unit, and (b) to output, to a display unit, a display image based on the selected image data; and
an acquiring unit configured to acquire information corresponding to a partial area of the display image displayed by the display unit, in response to a designation, by a user, of the partial area of the display image,
wherein the selecting unit is configured to select at least one image data among the plurality of image data based on the information corresponding to the partial area designated by the user.

25. The image output apparatus according to claim 24, wherein the plurality of image data is one set of plural image data continuously captured.

26. The image output apparatus according to claim 24, wherein the selecting unit is configured to select one image data among the plurality of image data based on the information corresponding to the partial area.

27. The image output apparatus according to claim 24, wherein the selecting unit is further configured to enlarge the partial area of the display image.

28. A non-transitory computer-readable storage medium storing a computer-executable program for implementing a method, the method comprising:

selecting at least one image data among a plurality of image data stored in a storage unit;

outputting, to a display unit, a display image based on the selected image data;

acquiring information corresponding to a partial area of the display image displayed by the display unit, in response to a designation, by a user, of the partial area of the display image; and selecting at least one image data among the plurality of image data based on the information corresponding to the partial area designated by the user.

29. The non-transitory computer-readable storage medium according to claim 28, wherein the plurality of image data is one set of plural image data continuously captured.

30. The non-transitory computer-readable storage medium according to claim 28, wherein the selecting is configured to select one image data among the plurality of image data based on the information corresponding to the partial area.

31. The non-transitory computer-readable storage medium according to claim 28, wherein the selecting is further configured to enlarge the partial area of the display image.

32. An image output apparatus comprising:

a selecting unit configured (a) to select at least one image among a plurality of images stored in a storage unit, and (b) to output, to a display unit, a display image based on the selected at least one selected image; and an acquiring unit configured to acquire a characteristic corresponding to a partial area of the display image displayed by the display unit, in response to a designation, by a user, of the partial area of the display image, wherein the selecting unit is configured to select at least one image among the plurality of images based on the characteristic corresponding to the partial area designated by the user.

33. The image output apparatus according to claim 32, wherein the plurality of images is one set of plural images continuously captured.

34. The image output apparatus according to claim 32, wherein the selecting unit is configured to select one image among the plurality of images based on the characteristic corresponding to the partial area.

35. The image output apparatus according to claim 32, wherein the selecting unit is further configured to enlarge the partial area of the display image.

36. A non-transitory computer-readable storage medium storing a computer-executable program for implementing a method, the method comprising:

selecting at least one image among a plurality of images stored in a storage unit;

outputting, to a display unit, a display image based on the at least one selected image;

acquiring a characteristic corresponding to a partial area of the display image displayed by the display unit, in response to a designation, by a user, of the partial area of the display image; and selecting at least one image among the plurality of images based on the characteristic corresponding to the partial area designated by the user.

37. The non-transitory computer-readable storage medium according to claim 36, wherein the plurality of images is one set of plural images continuously captured.

38. The non-transitory computer-readable storage medium according to claim 36, wherein the selecting is configured to select one image among the plurality of images based on the characteristic corresponding to the partial area.

39. The non-transitory computer-readable storage medium according to claim 36, wherein the selecting is further configured to enlarge the partial area of the display image.

40. An image output apparatus comprising:

a processor for executing a program stored in a memory to perform:

(1) selecting at least one image data among a plurality of image data stored in a storage unit, (2) outputting, to a display unit, a display image based on the selected at least one image data; and (3) acquiring a characteristic corresponding to a partial area of the display image displayed by the display unit, in response to a designation, by a user, of the partial area of the display image, wherein the selecting is configured to select at least one image data among the plurality of image data based on the characteristic corresponding to the partial area designated by the user.

41. The image output apparatus according to claim 40, wherein the plurality of image data is one set of plural image data continuously captured.

42. The image output apparatus according to claim 40, wherein the selecting is configured to select one image data among the plurality of image data based on the characteristic corresponding to the partial area.

43. The image output apparatus according to claim 40, wherein the selecting is further configured to enlarge the partial area of the display image.

44. An apparatus comprising:

a selecting unit configured (a) to select at least one item of image information among a plurality of items of image information stored in a storage device, and (b) to output, to a display device, a display image based on the selected at least one item of image information; and an acquiring unit configured to acquire a characteristic corresponding to a partial area of the display image displayed by the display device, in response to a designation, by a user, of the partial area of the display image, wherein the selecting unit is configured to select at least one item of image information among the plurality of items of image information based on the characteristic corresponding to the partial area designated by the user.

45. The apparatus according to claim 44, wherein the plurality of items of image information is one set of plural items of image information continuously captured.

46. The apparatus according to claim 44, wherein the selecting unit is configured to select one item of image information among the plurality of items of image information based on the characteristic corresponding to the partial area.

47. The apparatus according to claim 44, wherein the selecting unit is further configured to enlarge the partial area of the display image.

48. The apparatus according to claim 44, wherein each of the plurality of items of image information is a frame.

49. A device comprising:

selecting means for selecting an image information unit among a plurality of image information units stored in a storage device;

outputting means for outputting a display image based on the selected image information unit; and acquiring means for acquiring a characteristic corresponding to a partial area of the display image, in response to a designation, by a user, of the partial area of the display image, wherein the selecting means selects an image information unit among the plurality of image information units based on the characteristic corresponding to the partial area designated by the user.

50. The non-transitory computer-readable storage medium according to claim 11, the method further comprising:

outputting, to the display unit, a display image based on the at least one image data selected based on the characteristic.

51. The non-transitory computer-readable storage medium according to claim 28, the method further comprising:

outputting, to the display unit, a display image based on the at least one image data selected based on the characteristic.

52. The non-transitory computer-readable storage medium according to claim 36, the method further comprising:

outputting, to the display unit, a display image based on the at least one image data selected based on the characteristic.

\* \* \* \* \*